US009482366B2

(12) United States Patent
Tazioli et al.

(10) Patent No.: US 9,482,366 B2
(45) Date of Patent: Nov. 1, 2016

(54) CAP FOR COOPERATING WITH A FLOW CONTROL ELEMENT OF A VALVE FOR A SELF-PRIMING ELECTRIC PUMP

(71) Applicant: DAB PUMPS S.P.A., Mestrino (IT)

(72) Inventors: Stefano Tazioli, Localita Gabbro (IT); Francesco Sinico, Montecchio Maggiore (IT)

(73) Assignee: DAB PUMPS S.P.A., Mestrino (IT)

( * ) Notice: Subject to any disclaimer, the term of this patent is extended or adjusted under 35 U.S.C. 154(b) by 448 days.

(21) Appl. No.: 14/078,249

(22) Filed: Nov. 12, 2013

(65) Prior Publication Data

US 2014/0133960 A1 May 15, 2014

(30) Foreign Application Priority Data

Nov. 13, 2012 (IT) .............................. PD2012A0344

(51) Int. Cl.
| | |
|---|---|
| *F04D 9/02* | (2006.01) |
| *F16K 51/00* | (2006.01) |
| *F04D 15/00* | (2006.01) |
| *F16K 35/10* | (2006.01) |
| *F16K 27/12* | (2006.01) |
| *F04D 9/00* | (2006.01) |

(52) U.S. Cl.
CPC ............... *F16K 51/00* (2013.01); *F04D 9/005* (2013.01); *F04D 9/02* (2013.01); *F04D 15/0005* (2013.01); *F16K 27/12* (2013.01); *F16K 35/10* (2013.01); *Y10T 137/5109* (2015.04)

(58) Field of Classification Search
CPC ...... F04D 9/005; F04D 9/02; F04D 15/0005; F16K 51/00; F16K 27/12; F16K 35/10; Y10T 137/5109
See application file for complete search history.

(56) References Cited

U.S. PATENT DOCUMENTS 5,193,575 A * 3/1993 Do ......................... G05D 16/18
137/509
5,975,127 A * 11/1999 Dray ................... B29C 45/1603
137/495

FOREIGN PATENT DOCUMENTS

| DE | 29708193 U1 | 8/1997 |
| EP | 2479465 A1 | 7/2012 |
| GB | 774389 A | 5/1957 |
| WO | WO 2009/073060 A2 | 6/2009 |

OTHER PUBLICATIONS

Italian Search Report for PD20120344 dated Jul. 25, 2013.

* cited by examiner

*Primary Examiner* — Igor Kershteyn
(74) *Attorney, Agent, or Firm* — Koppel, Patrick, Heybl & Philpott

(57) ABSTRACT

A cap for cooperating with a flow control element of a valve for a self-priming electric pump, the valve being designed to open and close a recirculation duct for the passage of the recirculating fluid from the impeller assembly to an intake duct, the cap having a tubular body and, coaxially inside the latter, a mushroom-shaped element, which divides, with its head, the cap into a first portion and a second portion to be applied at an opening of the recirculation duct outward, respectively in the overhead and underhead installation of the self-priming electric pump, the axial space occupation of the head and of the stem of the mushroom-shaped element that is extended from the head toward the second portion defining two alternative axial positions of interaction with the flow control element of the valve in the overhead and underhead installation.

9 Claims, 4 Drawing Sheets

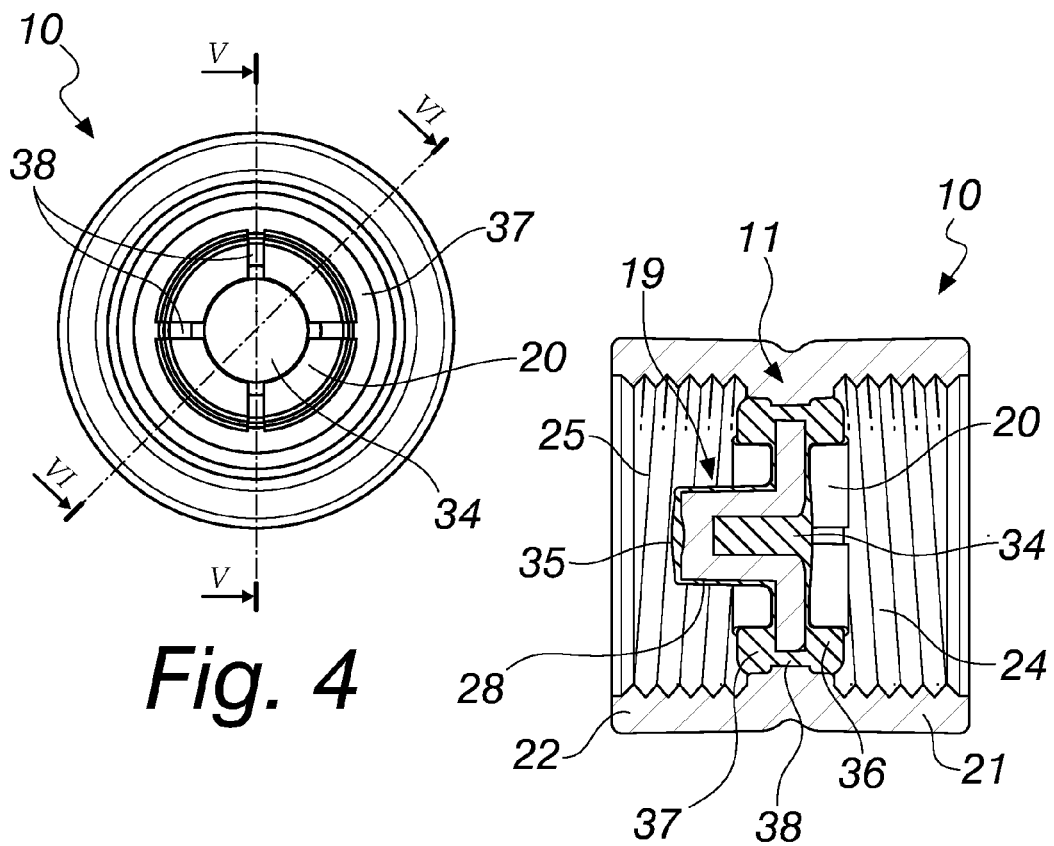
Fig. 4
Fig. 5
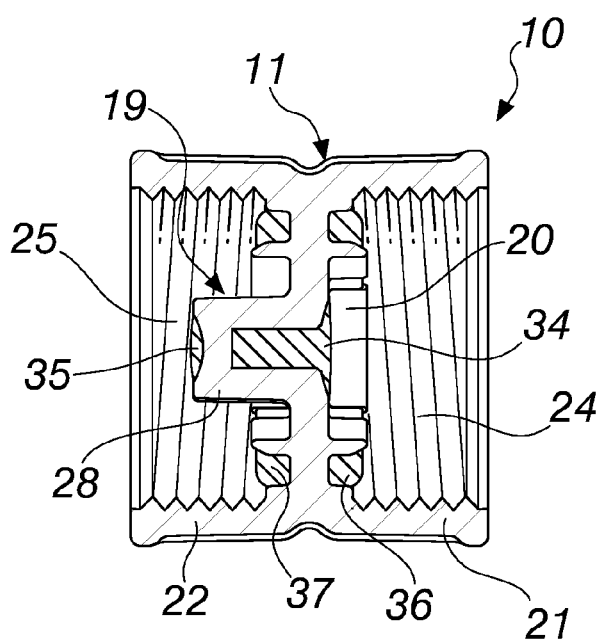
Fig. 6

CAP FOR COOPERATING WITH A FLOW CONTROL ELEMENT OF A VALVE FOR A SELF-PRIMING ELECTRIC PUMP

BACKGROUND OF THE INVENTION

The present invention relates to a cap for cooperating with a flow control element of a valve for a self-priming electric pump.

Currently, in the provision of hydraulic systems, the installation of overhead or underhead pumps, depending on the requirements, is widespread.

In the second case, during the pump starting step, the pump aspirates a certain percentage of air and a turbulent circuit is established between the intake region and the delivery region of the impellers. For this reason, it is necessary to provide for the pump a priming system, i.e., a system capable of priming the pump, freeing it from the air.

Self-priming centrifugal electric pumps are currently commercially available which can be installed both in an underhead configuration and in an overhead configuration and in which the self-priming system provides for the presence of a valve that uses a self-priming flow control element.

The self-priming flow control element substantially has the appearance of an elongated body inserted in a duct for recirculation, i.e., for the passage of part of the fluid in output from the set of impellers and diffusers that returns in recirculation to the intake duct. The flow control element usually has, on the side of the intake duct, a head that is surrounded by an O-ring with which it is preset to abut against an adapted shoulder, dividing the two said ducts to then close the passage of fluid in recirculation. A spring is interposed between the head and the opening of the intake duct. On the opposite side, the flow control element rests on a wall of the recirculation duct and therefore can slide, by a distance equal to the length of the spring, along its own longitudinal axis between the shoulder and the wall, in order to close or open the recirculation duct.

The operating principle of these self-priming pumps is as follows. The device draws from the intake duct low-pressure fluid, which is centrifuged in the pump body, acquiring pressure at each stage of the impeller and diffuser assembly, up to the maximum pressure that can be attained at the last of the impellers and diffusers. Part of the fluid, which during the step of activation of the device often contains a certain amount of air, is pushed toward the delivery of the pump, while another part skims the pump body and, through the recirculation duct, returns to the intake duct and therefore returns to circulation together with the intake fluid.

As long as the pump body is crossed by fluid containing air bubbles, the pressure in output is lower than the desired value and the valve remains open, allowing recirculating fluid to flow. These conditions cause a reduction in the performance of the pump, since not all the pumped fluid enters the delivery circuit of the system.

The valve closes automatically, and the pump in this case is termed primed, when in the fluid there is no longer air but only liquid and the difference in pressure between the fluid in output from the last stage of the pump and the fluid at the intake is such as to generate the movement of the flow control element toward the intake duct. The flow control element in fact overcomes the force opposed by the spring and abuts against the shoulder, closing the passage and thus preventing recirculation.

A drop in the delivery pressure causes the movement of the flow control element in the opposite direction and therefore the reopening of the valve and consequent losses that generate a reduction in performance.

This drawback cannot be solved when the self-priming pumps are installed in an underhead configuration, where the level of the water in the tank is higher than the intake level and therefore, since the water enters the pump intake by gravity, there is no air to be expelled with self-priming upon the activation of the device. The pressure variations at the delivery, by causing the movement of the flow control element, and before the opening of the valve, generate useless losses due to the recirculation of the water and noise due to the movement of the flow control element that abuts against the shoulder or against the wall that retains it in the recirculation duct.

SUMMARY OF THE INVENTION

The aim of the present invention is to provide a cap to be combined with the self-priming flow control element of a valve for a self-priming centrifugal electric pump that allows to use said pump without incurring useless losses during use in the underhead configuration.

Within this aim, an object of the invention is to devise a cap for flow control element that is structurally simple, is easy to use and can be manufactured with known technologies.

A further object of the invention is to devise a cap for flow control element that allows to reduce the level of noise of the pump during use both in the underhead installation and in the overhead installation.

This aim, as well as these and other objects that will become better apparent hereinafter, are achieved by a cap for cooperating with a flow control element of a valve for a self-priming electric pump, said valve being designed to open and close a recirculation duct for the passage of the recirculating fluid from the impeller assembly to the intake duct, said cap being characterized in that it has a tubular body and, coaxially inside the latter, a mushroom-shaped element, which divides, with its head, said cap into a first portion and a second portion to be applied with engagement means at an opening of said recirculation duct outward, respectively in the overhead and underhead installation of said self-priming electric pump, the axial space occupation of said head and of the stem of said mushroom-shaped element that is extended from said head toward said second portion defining two alternative axial positions of interaction with the flow control element of said valve in the overhead and underhead installation.

Furthermore, the invention relates to a valve for keeping the impeller assembly of a self-priming electric pump immersed in fluid to be pumped, characterized in that it comprises a flow control element for opening and closing a recirculation duct to be combined with the cap cited above.

The invention also relates to a self-priming electric pump, characterized in that it comprises said valve.

BRIEF DESCRIPTION OF THE DRAWINGS

Further characteristics and advantages of the invention will become better apparent from the description of a preferred but not exclusive embodiment of the cap according to the invention, illustrated by way of nonlimiting example in the accompanying drawings, wherein:

FIG. 4 is a plan view of the cap according to the invention, from the opposite side with respect to the preceding FIG. 3;

FIG. 5 is a sectional view of FIG. 4, taken along the line V-V;

FIG. 6 is a sectional view of FIG. 4, taken along the line VI-VI;

DESCRIPTION OF THE PREFERRED EMBODIMENTS

Figure 1:
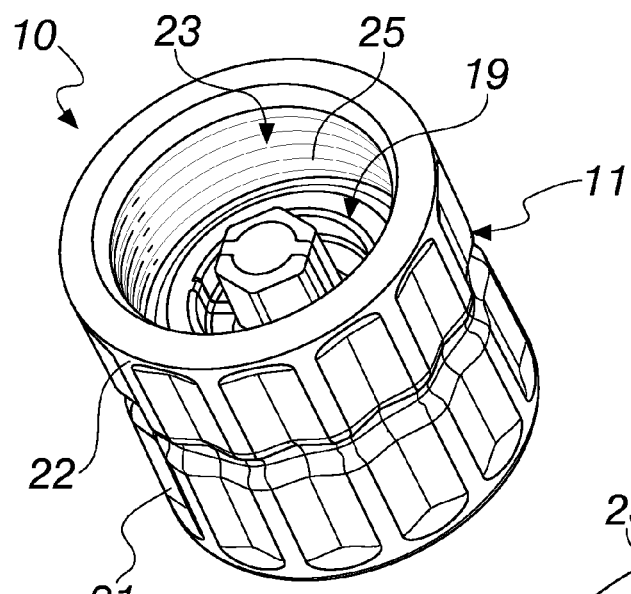
FIG. 1 is a perspective view of the cap according to the invention.
Figure 2:
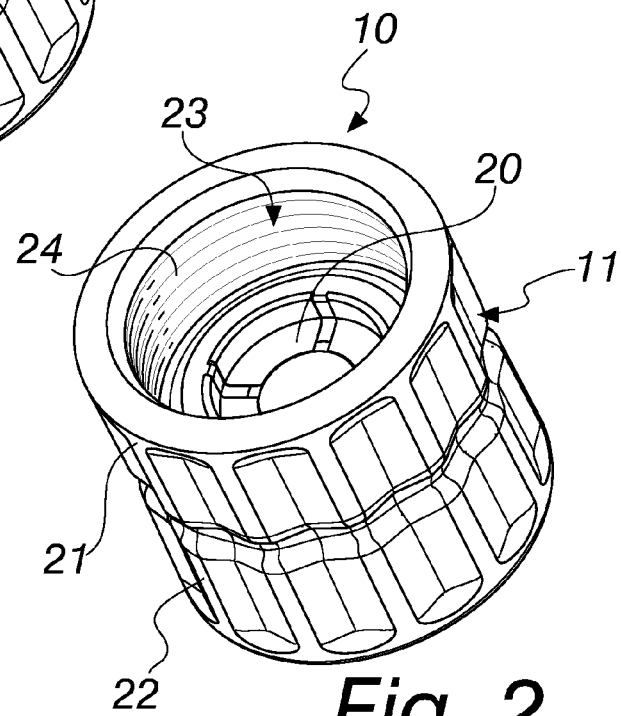
FIG. 2 is a perspective view of the cap according to the invention, shown inverted with respect to the preceding FIG. 1.

With reference to the figures, the cap according to the invention, generally designated by the reference numeral 10, has a tubular body 11 that is clearly visible in the perspective views of FIGS. 1 and 2 and is shaped on the outer surface in order to facilitate grip during application to or removal from the opening 12 of a recirculation duct 13.

Figure 7:
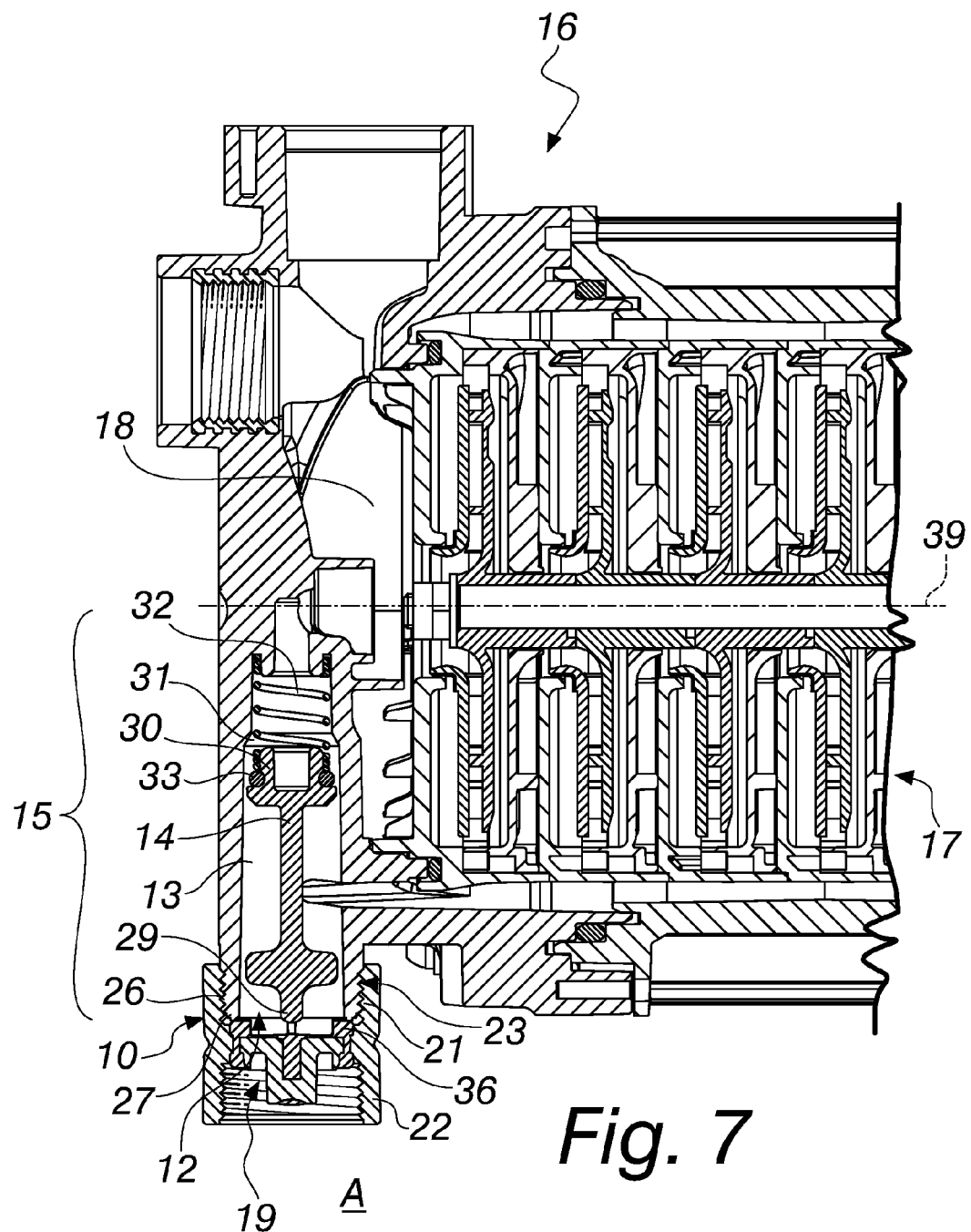
FIG. 7 is a view of the application of the cap according to the invention in the overhead installation of a self-priming electric pump.
Figure 8:
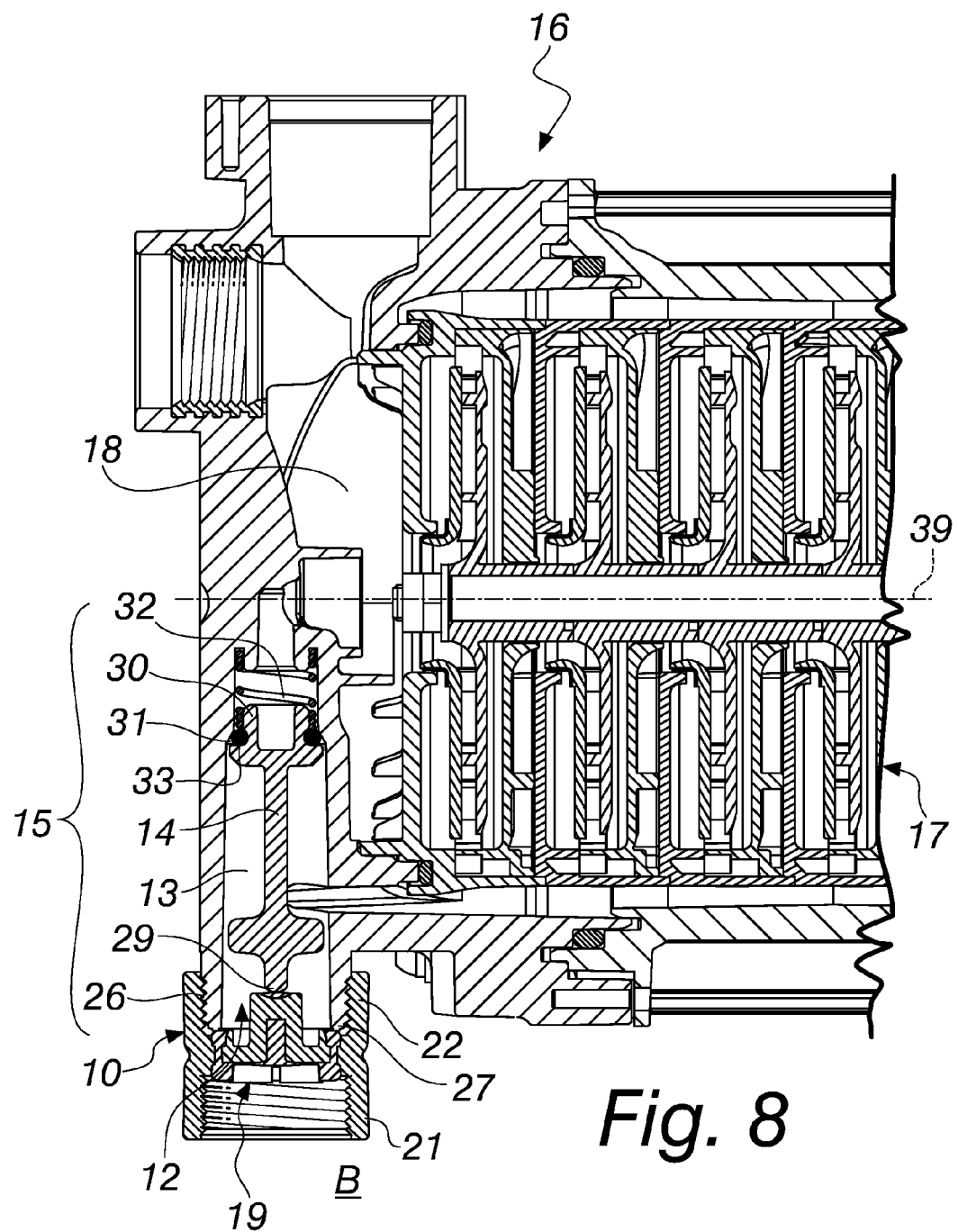
FIG. 8 is a view of the application of the cap according to the invention in the underhead installation of a self-priming pump.

The cap 10 is intended to be combined with a flow control element 14 of a valve 15 for the self-priming electric pump 16, which is illustrated partially in FIGS. 7 and 8. In particular, the valve 15 is preset to open and close the recirculation duct 13, which is intended for the flow of recirculating fluid from the impeller assembly 17 to the intake duct 18 of the self-priming electric pump 16.

Again from FIGS. 1 and 2 it is possible to note that the cap 10 also has, coaxially within the tubular body 11, a mushroom-shaped element 19, which is visible even more clearly in FIGS. 5 to 8.

The mushroom-shaped element 19 divides, with its head 20, the cap 10 into a first portion 21 and into a second portion 22 to be applied, by way of adapted engagement means 23, at the opening 12 of the recirculation duct 13 toward the outside, respectively in the overhead installation, designated by the reference letter A in FIG. 7, and in the underhead installation, designated by the reference letter B in FIG. 8, of the self-priming electric pump 16.

The engagement means 23 that allow to apply the cap 10 consist of a first female thread 24 and a second female thread 25, which are provided on the inner part respectively of the first portion 21 and of the second portion 22 and engage, alternatively with respect to each other in the overhead configuration A and in the underhead configuration B, a corresponding male thread 26 at the edge 27 of the opening 12 of the recirculation duct 13.

The axial space occupation of the head 20 and of the stem 28 of the mushroom-shaped element 19, which extends from the head 20 toward the second portion 22, defines two alternative axial positions for interaction with the flow control element 14 of the valve 15 in the two installations.

In particular, during the operation of the self-priming electric pump 16 in the overhead configuration A, the flow control element 14 is intended to abut, with an abutment end 29 against the head 20 of the mushroom-shaped element 19, as shown in FIG. 7, while between its opposite end 30 and a shoulder 31, at an opening that connects the recirculation duct 13 to the intake duct 18, a spring 32 is interposed which is preset to be compressed during priming, so that the flow control element 14, when the pump is primed, can close with said opposite end 30 the recirculation duct 13, occupying the opening and preventing entirely the passage of fluid by way of a gasket 33 of the O-ring type.

In the underhead configuration B shown in FIG. 8, instead, the flow control element 14 is coupled between the end of the stem 28, on which it is in contact with its abutment end 29, and the shoulder 31 at the opposite end 30.

In this manner, the stem 28 occupies lengthwise substantially the space that in the preceding configuration is occupied by the spring 32 when it is extended, so that already from the moment of installation it is compressed and the flow control element 14 closes the opening toward the intake duct 18.

In particular, the flow control element 14 rests advantageously on adapted abutment linings. The cap 10 is in fact provided with a first abutment lining 34 for the flow control element 14 on a central part of the head 20 on the side of the first portion 21 and with a second abutment lining 35 on the end of the stem 28 on the side of the second portion 22. These linings, the first one 34 and the second one 35, are made of elastomeric material.

The cap 10 is also advantageously provided with a first sealing ring 36 and a second sealing ring 37, respectively on the side of the first portion 21 and of the second portion 22, by means of which the cap 10 is associated with the edge 27 of the opening 12 of the recirculation duct 13.

Said sealing rings, the first one 36 and the second one 37, are made of the same elastomeric material as the first lining 34 and the second lining 35.

In particular, the cap 10 is provided by means of a single process for co-molding plastic material and elastomeric material.

More particularly, the sealing rings 36 and 37 are in one piece with the linings 34 and 35 thanks to connections 38, also made of elastomeric material, that pass through the head 20 from the first portion 21 to the second portion 22 and extend like spokes from the first lining 34 and from the second lining 35 respectively toward the first sealing ring 36 and the second sealing ring 37.

Figure 3:
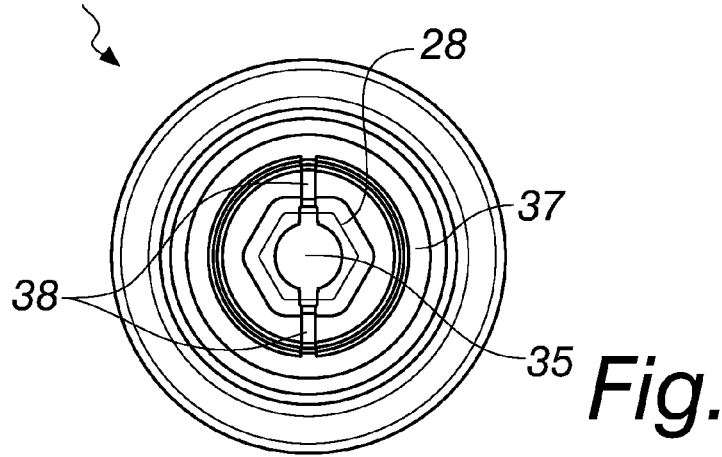
FIG. 3 is a plan view of the cap according to the invention.

The connections 38 are clearly visible in the plan views of FIGS. 3 and 4 and in the sectional view of FIG. 5.

The cap 10 therefore is provided by co-molding as a single monolithic body, constituted partly by plastic material and partly by elastomeric material.

As mentioned, the valve 15 and the self-priming electric pump 16 are also the subject of the present invention.

The valve 15, which is shown in FIGS. 7 and 8, comprises the flow control element 14 for the opening and closing of the recirculation duct 13, that is for cooperating with a cap 10, and the self-priming electric pump 16 is of the type that comprises the valve 15.

In particular, the valve 15 is arranged so that the flow control element 14 is arranged along an axis that is perpendicular to the rotation axis 39 of the impeller assembly 17 of the self-priming electric pump 16 and radially from the rotation axis 29 outward.

Use of the cap according to the invention is as follows.

For the installation of the self-priming electric pump 16 in the overhead configuration A, the cap 10 is screwed to the opening 12 by means of its first portion 21.

It should be noted that the first lining 34 allows to reduce significantly the level of noise due to the movement of the flow control element 14, which for example as the pressure of the water in output from the impeller assembly 17 decreases moves in the direction of the cap 10, abutting by means of the abutment end 29 on the head 20 (thus opening the connection to the intake duct 18).

For the installation of the same self-priming pump 16 in the underhead configuration B, the cap 10 is screwed to the opening 12 by means of its second portion 22.

In this manner, the flow control element 14 rests with its abutment end 29 on the end of the stem 28, which pushes it with the opposite and 30 so as to compress the spring 32 and thus close, already from the moment of installation, the connection to the intake duct 18.

The flow control element 14 is thus coupled in said position during the entire period of use of the self-priming electric pump 16. By way of this solution, in fact, the self-priming electric pump operates as a normal centrifugal pump designed exclusively for operation in the underhead configuration.

It should be noted that co-molding allows to incorporate in a single element the two sealing rings, the first one 36 and the second one 37, obtaining a reversible cap that does not require the application of an adapted O-ring or the movement thereof from one side to the other of the cap 10 as a function of the portion of be screwed.

A reversible cap, which can be applied easily and rapidly both in the overhead configuration A and in the underhead configuration B, depending on the type of installation, is obtained in a single process step.

In practice it has been found that the invention achieves the intended aim and objects, providing a cap for cooperating with a flow control element for self-priming centrifugal electric pump, which allows to utilize its performance without incurring useless losses if it is installed in an underhead configuration.

Another advantage of the cap according to the invention is that it is structurally simple, can be reproduced with known co-molding technologies and is easy to use.

A further advantage is to reduce the level of noise of the electric pump during use by way of the presence of the abutment linings.

The invention thus conceived is susceptible of numerous modifications and variations, all of which are within the scope of the appended claims; all the details may further be replaced with other technically equivalent elements.

In practice, the materials used, as so long as they are compatible with the specific use, as well as the contingent shapes and dimensions, may be any according to requirements and to the state of the art.

The disclosures in Italian Patent Application No. PD2012A000344 from which this application claims priority are incorporated herein by reference.

What is claimed is:

1. A cap for cooperating with a flow control element of a valve for a self-priming electric pump, said valve being designed to open and close a recirculation duct for a passage of a recirculating fluid from an impeller assembly to an intake duct, wherein said cap has a tubular body and, coaxially inside the latter, a mushroom-shaped element, which divides, with its head, said cap into a first portion and a second portion to be applied with engagement means at an opening of said recirculation duct outward, respectively in the overhead and underhead installation of said self-priming electric pump, an axial space occupation of said head and of a stem of said mushroom-shaped element that is extended from said head toward said second portion defining two alternative axial positions of interaction with the flow control element of said valve in the overhead and underhead installation.

2. The cap according to claim 1, further comprising a first abutment lining for said flow control element on a central part of said head on a side of said first portion and with a second abutment lining for said flow control element on an end of said stem on a side of said second portion, said first lining and said second lining being made of elastomeric material.

3. The cap according to claim 1, further comprising a first sealing ring and with a second sealing ring, respectively on a side of said first portion and of said second portion by means of which said cap associates with an edge of said opening of said recirculation duct.

4. The cap according to claim 3, wherein said first and second sealing rings are made of elastomeric material.

5. The cap according to claim 1, wherein it is provided in a single process of co-molding plastic material and elastomeric material.

6. The cap according to claim 1, wherein said engagement means comprise a first female thread and a second female thread, provided on an inner part respectively of said first portion and of said second portion, which engage, alternately with respect to each other in the overhead or underhead configurations, with a corresponding male thread at an edge of said opening of the recirculation duct.

7. A valve for keeping an impeller assembly of a self-priming electric pump immersed in a fluid to be pumped, comprising a flow control element, for opening and closing a recirculation duct, to be combined with a cap according to claim 1.

8. The valve according to claim 7, wherein it is arranged so that said flow control element is arranged along an axis that is perpendicular to the rotation axis of the impeller assembly of said self-priming electric pump and radially from said rotation axis outward.

9. A self-priming electric pump, comprising a valve according to claim 7.

* * * * *